US010365896B2

(12) United States Patent
Finke et al.

(10) Patent No.: US 10,365,896 B2
(45) Date of Patent: Jul. 30, 2019

(54) STORING DATA MODELS TOGETHER

(75) Inventors: Thomas Finke, Hockenheim (DE);
Daniel Buchmann, Eggenstein (DE);
Florian Kresser, Lobbach (DE);
Hans-Martin Ludwig, Sandhausen
(DE); Thomas Mueller, Wiesloch (DE)

(73) Assignee: SAP SE, Walldorf (DE)

( * ) Notice: Subject to any disclaimer, the term of this
patent is extended or adjusted under 35
U.S.C. 154(b) by 1174 days.

(21) Appl. No.: 13/305,717

(22) Filed: Nov. 28, 2011

(65) Prior Publication Data
US 2013/0138418 A1    May 30, 2013

(51) Int. Cl.
*G06F 8/10*    (2018.01)

(52) U.S. Cl.
CPC ...................... *G06F 8/10* (2013.01)

(58) Field of Classification Search
CPC ......... G06F 17/30557; G06F 17/30581; G06F
17/30575; G06F 17/30893; G06F 9/52
USPC .......... 709/203, 245, 209; 370/400; 707/705
See application file for complete search history.

(56) References Cited

U.S. PATENT DOCUMENTS

| 5,768,532 | A * | 6/1998 | Megerian | ...................... 709/245 |
| 7,490,141 | B1 * | 2/2009 | Cammarata | ............. H04L 63/08 |
| | | | | 709/219 |
| 8,756,273 | B2 * | 6/2014 | Buchmann | .............. G06F 21/00 |
| | | | | 370/400 |
| 2004/0054675 | A1 * | 3/2004 | Li | ................................ 707/100 |
| 2004/0215920 | A1 * | 10/2004 | Haas | ................. G06F 17/30067 |
| | | | | 711/216 |
| 2006/0028994 | A1 * | 2/2006 | Hofmann | .............. H04L 67/327 |
| | | | | 370/252 |
| 2009/0319544 | A1 * | 12/2009 | Griffin et al. | ................. 707/100 |
| 2011/0196824 | A1 * | 8/2011 | Maes | ....................... G06F 9/54 |
| | | | | 707/610 |

FOREIGN PATENT DOCUMENTS

CN    102708502    * 10/2012 ............. G06Q 30/02

OTHER PUBLICATIONS

Burks, W., Goldstine, H.H., Neumann, J., Preliminary Discussion of the Logical Design of an Electronic Computing Instrument, Collected Works of John von Neumann, vol. 5, pp. 34-79, The Macmillan Company, New York, 1963. Taken from report to the U.S. Army Ordnance Department, 1946.*

(Continued)

*Primary Examiner* — Brian S Cook
(74) *Attorney, Agent, or Firm* — Mintz Levin Cohn Ferris Glovsky and Popeo, P.C.

(57) ABSTRACT

A system and method for modeling cross system content between a hub and one or more backend systems is disclosed. Model content of one or more data models is stored in a model stack defined in a storage. The model content of each data model includes model metadata representing a model of a backend system. Cross model content is stored in a cross model stack. The cross model content includes reference metadata representing one or more references associated with a data model of one backend system and that reference a data model of another backend system. Central cross model content is stored in a central cross model stack. The central cross model content includes one or more cross elements that do not belong to the model content of any of the data models, and that establish a connection between two data models of different backend systems.

9 Claims, 3 Drawing Sheets

(56) References Cited

OTHER PUBLICATIONS

The Von Neumann Machine: Week 10 Reading for Foundations of Computing Systems http://www.ict.griffith.edu.au/~johnt/1004ICT/lectures/lecture07/Cragon-pp1-13.html From Cragon, Harvey G. (2000). Computer Architecture and Implementation. Cambridge University Press, Cambridge. pp. 1-13.*
Savage, J.E., Models of Computation: Exploring the Power of Computing 1998 Addison-Wesley.*
Yun, Y.D., Dynamic Initial Allocation and Local Reallocation Procedures for Multiple Stacks, Communications of the ACM, Feb. 1986 vol. 29 No. 2.*
Korsh, J., A Multiple-Stack Manipulation Procedure, Communications of the ACM, Nov. 1983 vol. 26 No. 11.*
Koopman, P.J., Modern Stack Computer Architecture, Systems Design & Network Conference, May 8-10, 1990, Santa Clara, CA. pp. 153-164.*
IBM_1992.pdf Generic Code Page Conversion Application Program Interface, IBM Technical Disclosure Bulletin, May 1992, US. vol. 34, 12. pp. 421-430.*
Extend Defined, New Riverside University Dictionary, ISBN 0-395-33957-X, 1994.*
Oracle_2008, Cross-Referencing for Master Data Management with Oracle Application Integration Architecture Foundation Pack, Oracle, Apr. 2008.*
Oracle_2011, Butler, D., Master Data Management, Oracle, 2011.*

\* cited by examiner

STORING DATA MODELS TOGETHER

TECHNICAL FIELD

The subject matter described herein relates to computing systems, and more particularly to modeling of cross-system scenarios.

BACKGROUND

In a computing system having a hub and various different backend systems, each backend system has a set of data models that form one or more stacks by including and referencing each other, thus realizing an enhancement concept for model content where the content of included models can be enhanced. The hub hosts a consolidated system of models, where every model represents the corresponding data model of an associated backend system. Consequently, data models of different backend systems with identical content refer to the same data model on the hub. In one example, references from content of a model A to content of a model B are only possible if B is included in model A directly or indirectly. These "inner stack" references only establish connections between the models within the same backend system.

Data establishing references between content of models of different backend systems consists of one of two types: 1) Autonomous cross elements that establish a connection between models of different systems but do not belong to the content of one of the systems. This includes, for example, associations between object types. 2) References that belong to elements of a model of one system (thus extending that particular model), and which refer to the content of the model of another system.

In conventional systems, the storage of cross elements of the first type described above suffers from a non unique storage location and possible redundancy. As these elements do not belong to a special model, the storage location is not clear. One possible solution includes storing them in all the models they reference, thus requiring resources to keep these copies synchronous.

Including content in a model of the second type described above burdens the development of non cross-system content with cross-system content. In addition the cross content of a model is visible in all models including this model even when there is no cross system scenario for the including models. In conventional systems, the cross elements of a model have to be switched off every time no cross system scenario is requested.

Accordingly, the development of cross-system scenarios and non cross-system scenarios is mixed up in conventional systems, and the activation and deactivation of cross-system scenarios is complicated.

SUMMARY

This document describes a system and method to model metadata that establishes references between the content of models of different backend systems in an efficient and transparent way. The system and method provide a structured storage of model content and cross model content that keeps different types of metadata separated. The system and method can be used to establish a development infrastructure for cross system scenarios. In particular, the shipment and versioning of cross model content can be better supported.

In various aspects, a system and method for modeling cross system content between a hub and one or more backend systems are disclosed. Model content of one or more data models is stored in a model stack defined in a storage. The model content of each of the one or more data models includes model metadata representing a model of a corresponding backend system. Cross model content is stored in a cross model stack defined in the storage. The cross model content includes reference metadata representing one or more references associated with a data model of one backend system and that reference a data model of another backend system. Central cross model content is stored in a central cross model stack in the storage. The central cross model content includes one or more cross elements that do not belong to the model content of any of the one or more data models, and that establish a connection between two data models of different backend systems.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

In a system and method to model metadata, references are established between the content of models of different backend systems in an efficient and transparent way. The system and method provide a structured storage of model content and cross model content that keeps different types of metadata separated. The system and method can be used to establish a development infrastructure for cross system scenarios. In particular, the shipment and versioning of cross model content can be better supported.

In accordance with implementations described herein, backend content is developed on different development systems. Cross content in general is developed on hub development systems where the content from all backend systems is present.

The canonical storage of content of the first type of data described above includes one or more separate central cross models containing all cross elements that do not belong to the content of one system. In order to establish an enhancement concept analogous to conventional models, these cross models themselves form a linear stack. The elements of these central cross models can reference content of any backend model.

Analogously, content of the second type is stored in separate cross models as well. As this content extends a specific backend model, the corresponding cross model must also include this backend model. This keeps the backend content and the cross content separated, which is necessary since the backend content and the cross content are developed on different development systems. As one example, if model A includes model B, then cross model xA belonging to model A also includes cross model xB belonging to model B, thus resulting in a cross model stack parallel to the model stack. Cross models can reference content of the central cross models and of backend models.

Figure 1:
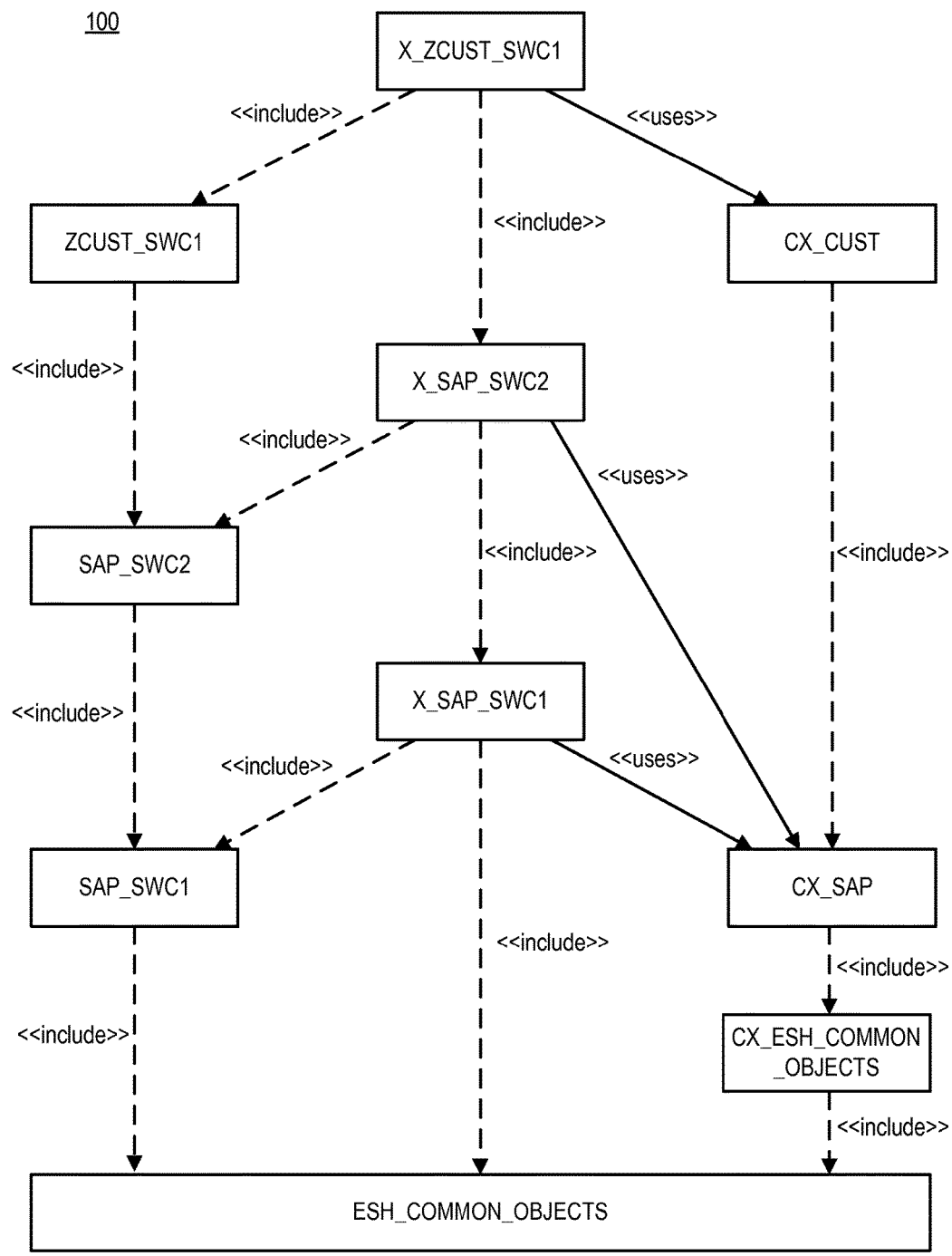
FIG. 1 illustrates modeling of cross system content, including a set of three types of intertwined stacks.

Accordingly, the modeling of cross system content includes a set of three types of intertwined stacks: model stack, cross model stack, and central cross model stack. FIG. 1 shows an exemplary system 100 having the three stacks that consist of: models (e.g. SAP_SWC1, SAP_SWC2, ZCUST_SWC1), cross models (X_SAP_SWC1, X_SAP_SWC2, X_:ZCUST_SWC1) and central cross models (CXESH_COMMON_OBJECTS, CX_SAP, CX_CUST) based on a common model (ESH_COMMON_OBJECTS) that makes available central elements relevant for all three types of stacks. The activation of cross system scenarios can easily be realized by activating the corresponding cross or central cross models.

Figure 2:
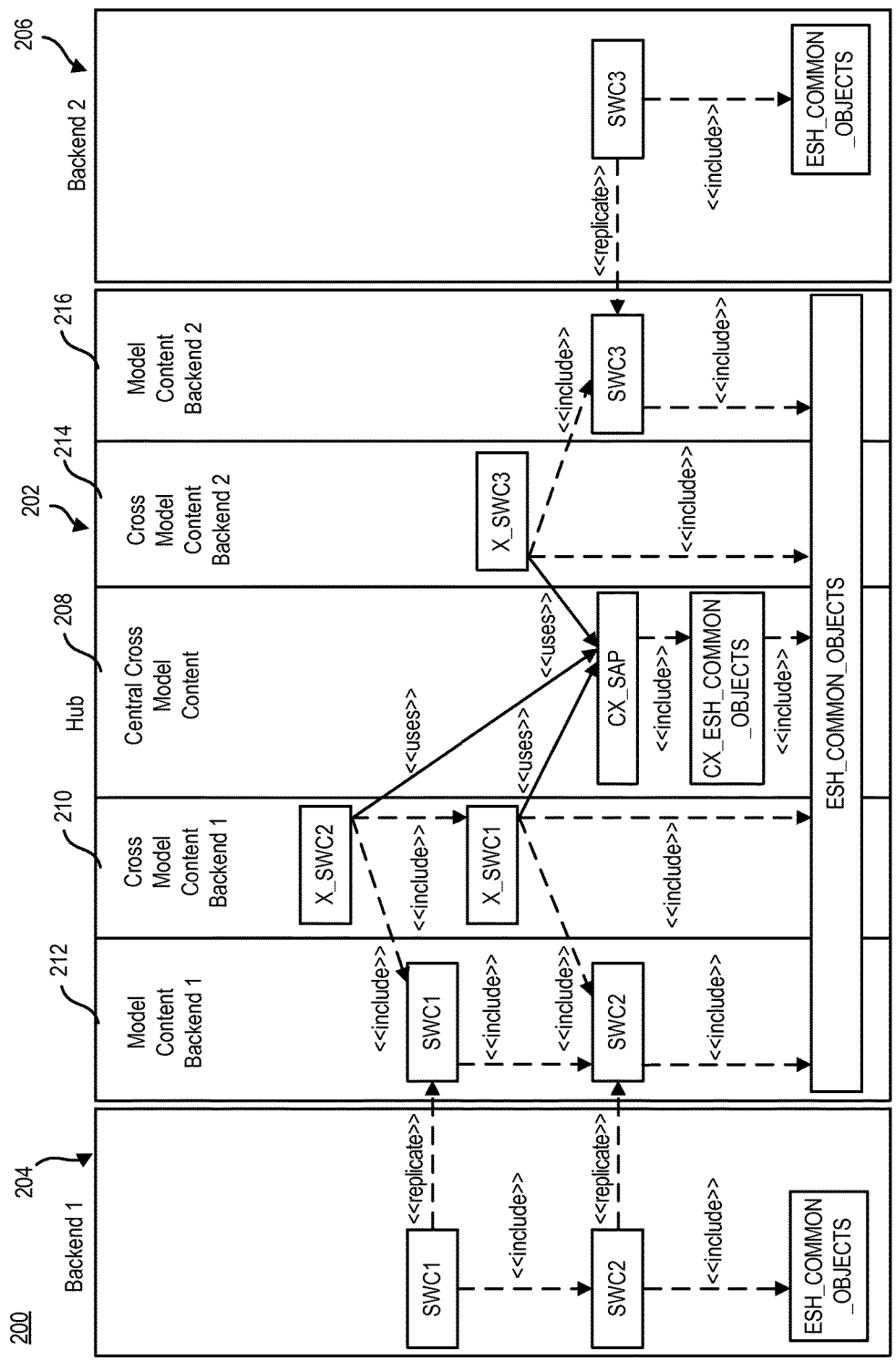
FIG. 2 is a diagram illustrating aspects of a system showing features consistent with implementations of the current subject matter.

FIG. 2 illustrates a system 200 for modeling cross system content between a hub 202 and one or more backend systems, 204 and 206. Consistent with the illustration of FIG. 1, the system 200 provides central cross model content 208, cross model content 210 for a first backend system 204, and model content 212 for the first backend system 204. The system 200 also provides cross model content 214 for a second backend system 206, and model content 216 for the second backend system 206. The system 200 can provide cross model content and model content for any number of backend systems as desirable.

Figure 3:
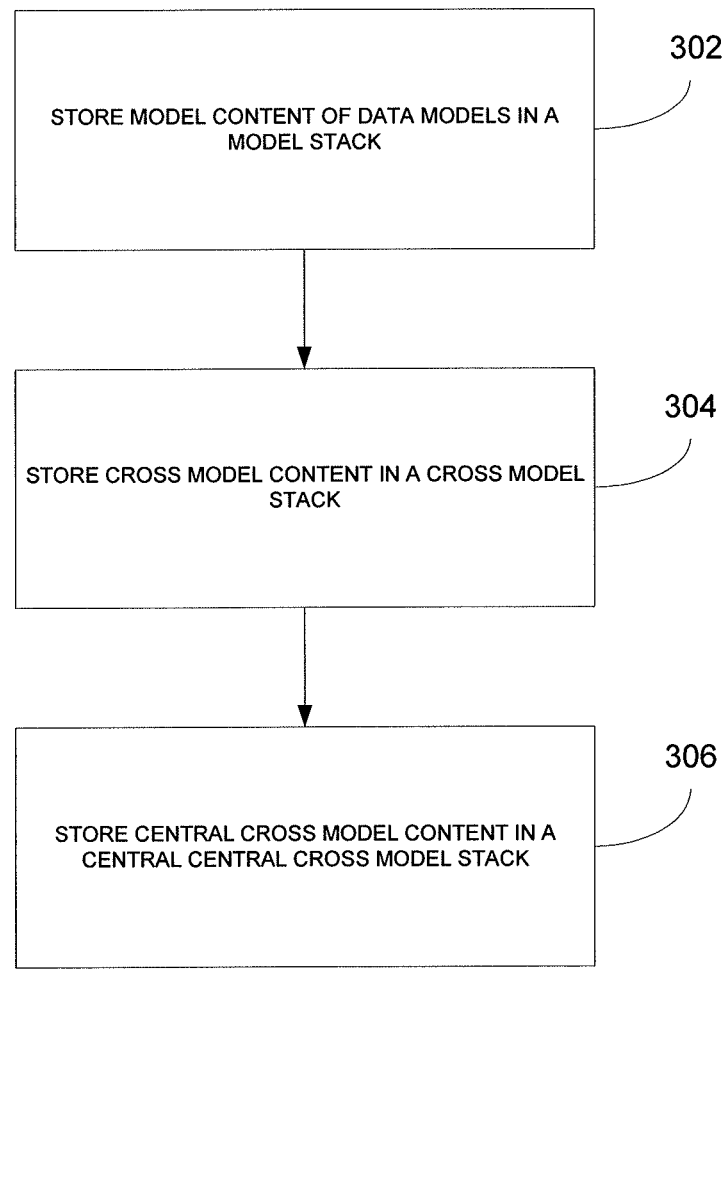
FIG. 3 is a process flow diagram illustrating aspects of a method having one or more features consistent with implementations of the current subject matter.

In accordance with implementations, as illustrated by FIG. 3, a method 300 for modeling cross system content between a hub and one or more backend systems. At 302, model content of one or more data models is stored in a model stack defined in a storage. The model content of each of the one or more data models includes model metadata representing a model of a corresponding backend system. At 304, cross model content is stored in a cross model stack defined in the storage. The cross model content includes reference metadata representing one or more references associated with a data model of one backend system and that reference a data model of another backend system. At 306, central cross model content is stored in a central cross model stack in the storage. The central cross model content includes one or more cross elements that do not belong to the model content of any of the one or more data models, and that establish a connection between two data models of different backend systems.

Implementations described herein result in an additive approach when activating cross system scenarios in contrast to the subtractive approach of the prior art. Here the cross system scenario is only active if the cross or central cross models are taken into account.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
    storing model content of one or more data models in a model stack defined in a first storage device, the model content of each of the one or more data models comprising model metadata representing a model of a corresponding backend system;
    storing cross model content in a cross model stack defined in a second storage device, the cross model content comprising reference metadata representing one or more references associated with a data model of one backend system and that reference a data model of another backend system, the second storage device being different from the first storage device such that the model content and the cross model content are stored separately in different storage devices; and
    storing central cross model content in a central cross model stack, the central cross model content comprising one or more cross elements that do not belong to the model content of any of the one or more data models, and that establish a connection between two data models of different backend systems,
    the cross model content using the central cross model content to extend the model content of the backend system.

2. The method in accordance with claim 1, further comprising activating the cross model content and the central cross model content to activate the two data models of the different backend systems.

3. The method in accordance with claim 2, wherein the activating includes executing a business application with the different backend systems.

4. A computer program product comprising a non-transitory machine-readable medium storing instructions that, when executed by at least one programmable processor, cause the at least one programmable processor to perform operations comprising:
    store model content of one or more data models in a model stack defined in a first storage device, the model content of each of the one or more data models comprising model metadata representing a model of a corresponding backend system;
    store cross model content in a cross model stack defined in a second storage device, the cross model content comprising reference metadata representing one or more references associated with a data model of one backend system and that reference a data model of another backend system, the second storage device being different from the first storage device such that the model content and the cross model content are stored separately in different storage devices; and
    store central cross model content in a central cross model stack, the central cross model content comprising one or more cross elements that do not belong to the model content of any of the one or more data models, and that establish a connection between two data models of different backend systems,
    the cross model content using the central cross model content to extend the model content of the backend system.

5. The computer program product in accordance with claim 4, further including operations comprising activate the cross model content and the central cross model content to activate the two data models of the different backend systems.

6. The computer program product in accordance with claim 5, wherein the operations to activate include operations to execute a business application with the different backend systems.

7. A system comprising:
    at least one programmable processor; and
    a machine-readable medium storing instructions that, when executed by the at least one processor, cause the at least one programmable processor to perform operations comprising:
        store model content of one or more data models in a model stack defined in a first storage device, the model content of each of the one or more data models comprising model metadata representing a model of a corresponding backend system;
        store cross model content in a cross model stack defined in a second storage device, the cross model content comprising reference metadata representing one or more references associated with a data model of one backend system and that reference a data model of another backend system, the second storage device being different from the first storage device such that the model content and the cross model content are stored separately in different storage devices; and
        store central cross model content in a central cross model stack, the central cross model content comprising one or more cross elements that do not belong to the model content of any of the one or more data models, and that establish a connection between two data models of different backend systems, the cross model content using the central cross model content to extend the model content of the backend system.

8. The system in accordance with claim 7, wherein the instructions further includes instructions to activate the cross model content and the central cross model content to activate the two data models of the different backend systems.

9. The system in accordance with claim 8, wherein the instructions to activate include instructions to execute a business application with the different backend systems.

* * * * *